United States Patent Office 2,911,592
Patented Nov. 3, 1959

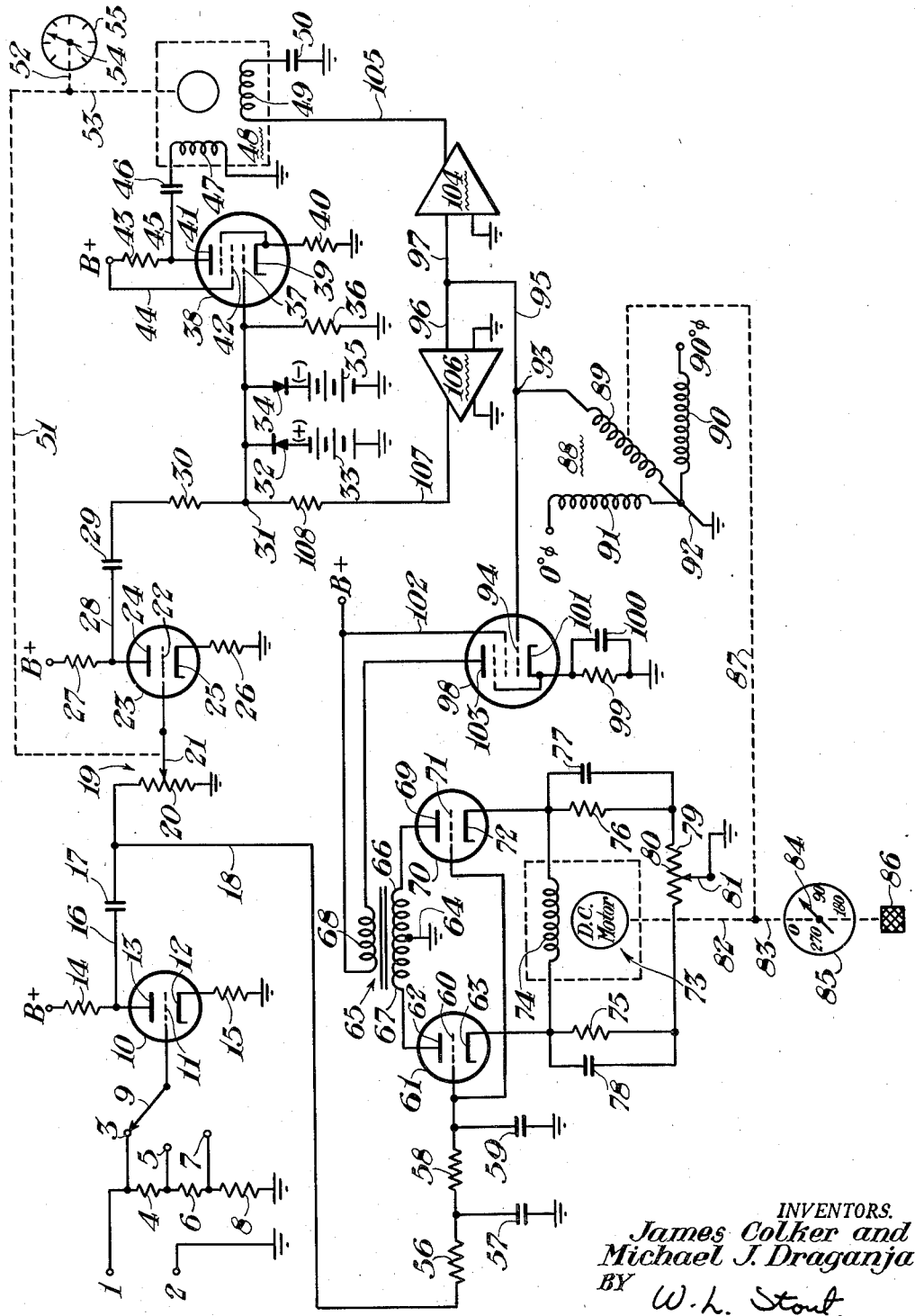

2,911,592

PHASE AND AMPLITUDE MEASURING SYSTEMS

James Colker, Penn Township, and Michael J. Draganjac, Etna, Pa., assignors to Westinghouse Air Brake Company, Wilmerding, Pa., a corporation of Pennsylvania Application June 1, 1955, Serial No. 512,404

8 Claims. (Cl. 324—83)

This invention relates to the measurement of electrical quantities, and particularly to the simultaneous measurement of the phase and amplitude of an alternating voltage.

In testing and servicing electrical equipment, it is frequently necessary to ascertain the relative phase as well as the amplitude of alternating voltages at various points in the equipment under consideration. For this purpose, it has previously been necessary to employ separate instruments, i.e. a phasemeter and a voltmeter, which frequently precludes the simultaneous measurement of both quantities. To avoid this difficulty, the present invention provides a means for measuring both phase and amplitude which is of novel and inexpensive construction and is convenient in operation.

Accordingly, it is an object of our invention to provide an instrument for simultaneously indicating the phase and amplitude of an alternating voltage.

It is a further object of our invention to provide a combined phasemeter and voltmeter which does not require special standards for voltage comparison.

It is a further object of our invention to provide a phasemeter which does not require a constant amplitude input.

It is a further object of our invention to provide a combined phase and amplitude measuring servo system in which the reference voltage required in the amplitude channel is derived from the phase channel.

It is a further object of our invention to provide a combined phase and amplitude measuring servo system which is stable and rapid in operation.

Other objects and further advantages of our invention will be apparent to those skilled in the art as the description proceeds.

We shall describe one embodiment of our invention, and shall then point out the novel features thereof in claims.

The drawing comprises a single figure showing a wiring diagram of one embodiment of our invention.

Referring to the drawing, the source of voltage to be tested is connected across input terminals 1 and 2. A series of range resistors such as 4, 6 and 8 are connected across the input, and range terminals 3, 5 and 7 are provided to cooperate with switch 9 to select the desired range of measurement. The signal is applied to a preliminary amplifier which may be of any conventional type, here shown as a triode 10 having a grid 11 connected to switch 9, a cathode 12 grounded through biasing resistor 15, and a plate connected to a suitable source of operating voltage through resistor 14. Output lead 16 is coupled to succeeding stages through capacitor 17.

The phase measuring channel is energized from the signal across capacitor 17 by lead 18. Lead 18 is connected to a phase shifting network comprising series resistors 56 and 58 and shunting capacitors 57 and 59 which shift the signal 90° in phase. The phase shifted signal is applied simultaneously to grids 60 and 71 of phase discriminator tubes 61 and 70, respectively.

The plates of discriminators 61 and 70 are energized from a source of alternating voltage of reference amplitude through resolver 88. Resolver 88 has stator windings 90 and 91 in space quadrature, winding 91 being energized by a voltage of reference phase, and winding 90 being energized by a voltage in quadrature with the reference. These voltages should be of constant magnitude and of the same frequency as those to be measured, and may be derived in any conventional manner. For example, they could be derived by connecting winding 91 across a conventional power outlet, and connecting winding 90 across winding 91 through a suitable phasing capacitor. Rotor 89 of resolver 88 is driven by D.C. motor 73 in a manner to be described. Winding 89 has a common ground terminal 92 with windings 90 and 91, and an output terminal 93 connected through a suitable amplifier such as pentode 98 to winding 68 of plate transformer 65.

Amplifier 98 may be of any conventional construction, but as here shown comprises a pentode having a cathode 101 directly connected to a suppressor grid, and a cathode bias resistor 99 by-passed by capacitor 100. Plate 103 of pentode 98 is connected through primary 68 of transformer 65 to a suitable source of operating voltage B+. A screen 102 is provided and is also connected to B+.

Transformer 65 has a secondary winding which is center tapped at 64 and comprises windings 66 and 67. Coil 66 is connected to plate 69 of tube 70, and coil 67 is connected to plate 62 of tube 61. Accordingly, the voltage from resolver 88 applied through amplifier 98 to primary 68 is applied to the plate of triode 70 180° out of phase with the plate of triode 61.

Cathode 63 of triode 61 is connected through resistor 75 and by-pass capacitor 78 to one side of a potentiometer 79, and cathode 72 of triode 70 is connected through a resistor 76 and by-pass capacitor 77 to the other side of potentiometer 79. Potentiometer 79 comprises a resistor 80 and a wiper 81 which is grounded as shown, for the purpose of balancing the output of triodes 61 and 70.

The D.C. motor 73 has a control winding 74 connected between cathodes 63 and 72. When triodes 61 and 70 are unequally conducting, a pulsating direct current flows through winding 74 and causes the motor to rotate in a direction depending upon which of the tubes predominates. Motor 73 has a mechanical output comprising any conventional arrangement of shafts, gearing and levers, including suitable clutches if so desired. One branch 83 of this connection is connected to needle 84 of phase indicator 85. Indicator 85 is graduated in degrees of phase angle with respect to the reference source supplied to resolver 88. A manual adjustment 86 may be provided if desired to aid in calibrating the instrument. Branch 87 of mechanical connection 82 is connected to rotor 89 of resolver 88.

The operation of this portion of the system will now be described. Assume a signal of arbitrary magnitude and phase to be applied to lead 18. This signal is shifted 90° in phase in network 56, 57, 58 and 59 as previously described and is applied to the grids of tubes 61 and 70. Since the plates of tubes 61 and 70 are energized by voltages 180° out of phase, the signal on the grids will in general have a component aiding conduction in one tube more than the other. Accordingly, the tubes will conduct differentially, and a voltage will appear across winding 74. The motor will rotate in a direction depending upon the direction of unbalance, operating rotor 89 of resolver 88 through connection 87. The output of resolver 88 will be amplified in pentode 98 and applied to the plates of tubes 61 and 70 through transformer 65. Since rotation of the resolver rotor changes the phase of the voltage applied to the plates, at some point a condition will be reached where the voltage on the plates is in quadrature with the voltage on the grids. Under these conditions, tube 61 will conduct during one part of the cycle, and tube 70 will conduct during another part of the cycle for an equal length of time. Accordingly, there will be no net flow of direct current to winding 74 of motor 73, and the motor will stop.

At this time, the signal at terminal 93 will be 180° out of phase with the signal on lead 18. Since the movement of rotor 89 of resolver 88 is a measure of the phase angle between the reference voltage applied to the stator of the resolver and signal on lead 18, the amount of rotation of motor 73 necessary to achieve this movement is a measure of the phase angle of the voltage on lead 18. Accordingly, needle 84 of indicator 85 will indicate the correct phase angle of the applied voltage.

The signal across condenser 17 is also applied across potentiometer 19. Potentiometer 19 comprises resistor 20 which is grounded as shown and a wiper 21 which is adjustable on resistor 20. Wiper 21 is adjusted by a servo motor 48 in a manner to be described.

The signal from wiper 21 is amplified in a conventional stage illustrated as a triode 23 having a plate 24 connected to B+ through a suitable resistor 27 and a cathode 25 connected to ground through a biasing resistor 26. Grid 22 of tube 23 is connected to wiper 21. The output of stage 23 is coupled to following stages through plate lead 28 and capacitor 29. The voltage output across capacitor 29 is applied to summing resistor 30.

The output at terminal 93 of the phase measuring circuit is a voltage of constant amplitude and 180° out of phase with the test voltage as previously described. This output is applied through leads 95 and 96 and a conventional amplifier 106 to a second summing resistor 108. The voltage at terminal 31 is accordingly the algebraic sum of two voltages 180° out of phase, the voltage across resistor 108 being proportional to the amplitude of the reference voltage and the voltage across resistor 30 being proportional to the amplitude of the voltage under test.

Terminal 31 is connected across a limiting network comprising rectifier 32 and battery 33 in one path to ground, and rectifier 34 and battery 35 in a parallel path to ground. The limited output is applied across resistor 36 to grid 37 of a suitable amplifier such as pentode 38.

Pentode 38 has a cathode 39 connected to a suppressor grid and to ground through a biasing resistor 40. Screen 42 is connected to B+ through lead 44 and plate 41 is connected to B+ through resistor 43. The output on lead 45 is coupled through capacitor 46 to control winding 47 of servomotor 48. Servomotor 48 may be of any conventional construction, but as here shown comprises a two phase alternating current motor. The second phase winding 49 of motor 48 has a phasing capacitor 50 and is energized from terminal 93 in the phase measuring network through leads 95 and 97, amplifier 104 and lead 105. This arrangement is necessary to ensure that winding 49 has a fixed phase relationship with the reference voltage.

Servomotor 48 has a conventional mechanical output 53, which may include suitable reduction gearing and clutches if so desired. Branch 52 of connection 53 is connected to needle 54 of amplitude indicating dial 55. Dial 55 is graduated in terms of voltage amplitude. Branch 51 of connection 53 is connected to wiper 21.

The operation of this portion of the system will now be described. Since the phasemeter channel will operate to balance as previously described regardless of the operation of servomotor 48, assume that this operation has taken place and that the phasemeter channel is balanced with the signal at terminal 93 180° out of phase with the input signal across capacitor 17. The signal across potentiometer 19 is amplified in tube 23 and compared with the voltage from terminal 93 in the summing network comprising resistors 30 and 108. The resultant signal at terminal 31 is limited and applied to grid 37 of tube 38. In practice, amplifier 106 will be designed to have constant gain. Accordingly, the signal on grid 37 will be a measure of the difference between the reference amplitude and the input signal amplitude. This signal will cause conduction in tube 38 to apply an operating signal across winding 47 of servomotor 48. Servomotor 48 will then rotate to move wiper 21 through connection 51 until the voltages across resistors 30 and 108 are balanced and the signal at grid 37 is reduced to zero. At this time, the system is balanced and the motor will stop. The position of needle 54 will directly indicate the amplitude of the voltage under test.

The operation of the system as a whole will now be described. Assume that an input signal is applied across terminals 1 and 2, and that range switch 9 is set in an appropriate position engaging one of terminals 3, 5 and 7. This signal is amplified in tube 10 and applied simultaneously to the grid of tube 23 and to the grids of discriminator tubes 61 and 70. At this time, wiper 21 may first assume an arbitrary position on resistor 20, because servomotor 48 cannot be balanced until the phase of the voltage applied across resistor 108 is brought into opposition with that applied across resistor 30. However, the operation of discriminator tubes 61 and 70 to control motor 73, which drives resolver 88, will take place regardless of the position of servomotor 48. Accordingly, the signal at terminal 93 will quickly be brought into phase opposition with the signal on lead 18. Thereafter, servomotor 48 will immediately seek a balance as previously described. The system is accordingly rapid and stable, since the magnitude of the signal on lead 18 has only a minor effect on the timing of stabilization of the phasemeter network, and the ultimate balance of this network is independent of such amplitude.

While we have described one embodiment of our invention in detail, many changes and modifications thereof will become apparent to those skilled in the art upon reading this disclosure. Accordingly, we do not wish to be limited by the details shown, but only by the scope of the following claims.

Having thus described our invention, what we claim is:

1. A motor control system, comprising, in combination, a pair of electron discharge devices each having an anode, a cathode and a control electrode, means for applying a first alternating voltage of predetermined frequency to said control electrodes, a direct current motor having a control winding connected across said cathodes, a resolver driven by said motor and adapted to be energized by a source of alternating voltage of said predetermined frequency and of reference phase, and means operatively connecting said resolver to said anodes in phase opposition, whereby said motor is positioned in accordance with the phase of said first alternating voltage.

2. Means for measuring the phase and amplitude of an alternating voltage, comprising, in combination, servomotor means, control means for actuating said servomotor means to an extent in accordance with the phase of an applied voltage relative to a voltage of reference phase, means driven by said servomotor means to produce an alternating reference voltage of opposite phase to said applied voltage and of constant amplitude, means controlled by said last named means and said applied voltage for deriving a signal representative of the difference in amplitude between the applied voltage and the constant amplitude reference voltage, a phase indicator actuated by said servomotor means, a second servomotor means, control means responsive to said signal and connected to said second servomotor means for actuating said second servomotor means to an extent in accordance with the difference in amplitude between said applied and reference voltages, and an amplitude indicator actuated by said second servomotor means.

3. In a system for measuring the phase and amplitude of an alternating voltage, in combination, adjustable means for producing an alternating reference voltage of variable phase and constant magnitude, phase shifting means adapted to be connected to a source of alternating voltage to be measured for producing an output voltage in quadrature with said voltage to be measured, discriminator means connected to said adjustable means and said phase shifting means for comparing said reference voltage on said quadrature voltage and producing a control voltage in accordance with departure of said compared voltages from a quadrature phase relationship, first servomotor means actuated by said control voltage and connected to adjust said adjustable means to vary the phase of its output until it is in quadrature with said phase shifting means voltage, whereby the output of said adjustable means is brought into phase opposition with said voltage to be measured, adjustable attenuating means adapted to be connected to said source of voltage to be measured, second servomotor means drivably connected to adjust said attenuating means, and balanceable control means for said second servomotor means responsive to the vector sum of the outputs of said adjustable means and said attenuating means for actuating said servomotor means to adjust the output of said attenuating means into balance with the output of said adjustable means.

4. A system for measuring the phase and amplitude of an alternating voltage, comprising, in combination, a phase discriminator for producing a control voltage in accordance with the phase difference between two applied alternating voltages, input means for applying an alternating voltage to be measured to said phase discriminator, control means comprising an input device and an adjustable output device for producing a variable phase voltage of constant amplitude from a reference voltage applied to said input device, said output device being operatively connected to said phase discriminator, a first motor controlled by said phase discriminator control voltage, means connecting said motor to adjust said output device for varying the phase of the voltage applied to said phase discriminator to reduce said control voltage to zero, an attenuator connected to said input means and having an output, summing means energized by said control means output device voltage and said attenuator output voltage for deriving a voltage proportional to the algebraic sum thereof, a second motor connected to adjust said attenuator, means for controlling said second motor in response to said summing means to reduce said algebraic sum to zero, a phase indicator actuated by said first motor, and an amplitude indicator actuated by said second motor.

5. In a phase and amplitude measuring system, in combination, phase responsive means for producing a control voltage in accordance with the difference from phase opposition between two applied alternating voltages, input means for applying an alternating voltage to be measured to said phase responsive means, adjustable means for deriving a voltage of variable phase and constant amplitude from a voltage of reference phase and amplitude connected to apply said derived voltage to said phase responsive means, a first motor controlled by said phase responsive means in accordance with said control voltage, means connecting said first motor to adjust said adjustable means, whereby its output voltage is adjusted into phase opposition with the voltage to be measured, an attenuator connected to said input means and having an output, summing means energized by said adjustable means output and said attenuator output for deriving a voltage proportional to the algebraic sum thereof, a second motor connected to adjust said attenuator, and means for controlling said second motor in response to said summing means to adjust the output to said attenuator until said summing means voltage is reduced to zero.

6. Apparatus of the class described, comprising, in combination, a servomotor, balanceable control means for said servomotor, adjustable means actuated by said servomotor and connected to said control means for applying a variable portion of an alternating voltage to be measured to said control means, a source of reference voltage of constant amplitude, phase shifting means for deriving a voltage of constant amplitude and in phase opposition to said alternating voltage to be measured from said reference source, and means for applying said voltage derived from said phase shifting means to said balanceable control means in opposition to said voltage to be measured to operate said servomotor until said adjustable means output balances said phase shifting means output.

7. In a phase and amplitude measuring system, in combination, a pair of electron discharge devices each having an anode, a cathode and a control electrode, means for applying a first alternating voltage to be measured to said control electrodes, a resolver having an adjustable output winding and input winding means adapted to be energized by a second alternating voltage of predetermined phase and amplitude to produce a voltage in said output winding having a phase in accordance with the extent of said adjustment and a constant amplitude, means for applying said resolver output voltage to said anodes in phase opposition, a direct current motor having a winding connected across said cathodes, means operatively connecting said motor to adjust said resolver output winding until said cathodes are at equal potentials, an adjustable attenuator, means for applying said first alternating voltage to said attenuator, and means controlling said servomotor in accordance with the difference in output between said attenuator and said resolver to adjust said attenuator output to equal said resolver output in amplitude.

8. The apparatus of claim 7, in which a phase indicator is connected to said direct current motor, and an amplitude indicator is connected to said servomotor.

References Cited in the file of this patent

UNITED STATES PATENTS

| | | |
|---|---|---|
| 1,992,625 | Mathes | Feb. 26, 1935 |
| 2,524,515 | Chapman | Oct. 3, 1950 |
| 2,548,014 | Gealt | Apr. 10, 1951 |
| 2,564,682 | Fisk et al. | Aug. 21, 1951 |
| 2,677,086 | McAdie | Apr. 27, 1954 |
| 2,679,630 | Felch et al. | May 25, 1954 |
| 2,742,618 | Weber | Apr. 17, 1956 |
| 2,808,550 | Carney | Oct. 1, 1957 |
| 2,851,662 | True et al. | Sept. 9, 1958 |